United States Patent
Zarrella

(10) Patent No.: US 11,526,670 B2
(45) Date of Patent: Dec. 13, 2022

(54) MACHINE LEARNING OF COLLOQUIAL PLACE NAMES

(71) Applicant: The MITRE Corporation, McLean, VA (US)

(72) Inventor: Jeffrey Zarrella, Denver, CO (US)

(73) Assignee: The MITRE Corporation, McLean, VA (US)

( * ) Notice: Subject to any disclaimer, the term of this patent is extended or adjusted under 35 U.S.C. 154(b) by 965 days.

(21) Appl. No.: 16/146,298

(22) Filed: Sep. 28, 2018

(65) Prior Publication Data

US 2020/0104361 A1 Apr. 2, 2020

(51) Int. Cl.
*G06F 16/00* (2019.01)
*G06F 40/284* (2020.01)
(Continued)

(52) U.S. Cl.
CPC .......... *G06F 40/284* (2020.01); *G06F 16/284* (2019.01); *G06F 16/29* (2019.01);
(Continued)

(58) Field of Classification Search
CPC .............................. G06F 16/29; G06F 16/284
(Continued)

(56) References Cited

U.S. PATENT DOCUMENTS

| | | |
|---|---|---|
| 8,140,335 B2 | 3/2012 | Kennewick et al. |
| 8,346,791 B1 * | 1/2013 | Shukla ................ G06F 16/3338 |
| | | 707/759 |

(Continued)

FOREIGN PATENT DOCUMENTS

WO 2012/172160 A1 12/2012

OTHER PUBLICATIONS

Hemachandra, S. et al. (2014) "Learning Spatial-Semantic Representations from Natural Language Descriptions and Scene Classifications," Robotics and Automation (ICRA) IEEE International Conference, May 31-Jun. 5, Hong Kong, China; pp. 2623-2630.
(Continued)

*Primary Examiner* — Ashish Thomas
*Assistant Examiner* — Rezwanul Mahmood
(74) *Attorney, Agent, or Firm* — Morrison & Foerster LLP

(57) ABSTRACT

Provided are systems and methods directed to identifying relationships between colloquial place names in a relational database. In some embodiments, a method of identifying relationships between colloquial place names in a relational database comprises receiving geographic location information; generating a vector corresponding to the geographic location; comparing the geographic location information vector to a plurality of colloquial place name vectors in a relational database that maps a plurality of colloquial place names to a plurality of corresponding colloquial place name vectors in a vector space, to generate a plurality of similarity scores that is calculated based on the geographic location information vector and each colloquial place name vector of the plurality of colloquial place name vectors; and identifying that one or more colloquial place names in the relational database are related to the geographic location information based on the plurality of similarity scores.

20 Claims, 7 Drawing Sheets

(51) Int. Cl.
*H04W 4/02* (2018.01)
*G06F 17/16* (2006.01)
*G06N 20/00* (2019.01)
*G06F 16/29* (2019.01)
*G06F 16/28* (2019.01)

(52) U.S. Cl.
CPC ............ *G06F 17/16* (2013.01); *G06N 20/00* (2019.01); *H04W 4/023* (2013.01)

(58) Field of Classification Search
USPC ........................................................ 707/736
See application file for complete search history.

(56) References Cited

U.S. PATENT DOCUMENTS

| | | | |
|---|---|---|---|
| 8,478,701 B2 | 7/2013 | Murdock et al. | |
| 8,712,690 B1* | 4/2014 | White | G01S 5/02523 |
| | | | 701/445 |
| 10,169,315 B1* | 1/2019 | Heckel | G06N 3/0481 |
| 10,496,924 B1* | 12/2019 | Highnam | G06N 3/082 |
| 10,681,155 B1* | 6/2020 | Sanz | H04L 67/535 |
| 10,699,077 B2* | 6/2020 | Mehdad | G06F 40/295 |
| 10,831,752 B2* | 11/2020 | Bordawekar | G06F 16/2468 |
| 11,086,857 B1* | 8/2021 | Ganu | G06F 16/24522 |
| 11,120,334 B1* | 9/2021 | Carvalho | H04L 51/10 |
| 2005/0228645 A1* | 10/2005 | Nishimura | G06F 16/434 |
| | | | 704/E15.04 |
| 2012/0284307 A1* | 11/2012 | Meyer | G06Q 30/0269 |
| | | | 707/769 |
| 2014/0195139 A1* | 7/2014 | Smith | G08G 5/0026 |
| | | | 701/120 |
| 2015/0339288 A1* | 11/2015 | Baker | G06F 40/166 |
| | | | 704/9 |
| 2016/0140643 A1* | 5/2016 | Nice | G06F 16/3344 |
| | | | 705/26.7 |
| 2016/0378868 A1* | 12/2016 | Har-Noy | G06Q 50/01 |
| | | | 707/706 |
| 2017/0013408 A1 | 1/2017 | Grzywaczewski et al. | |
| 2017/0032257 A1* | 2/2017 | Sharifi | G06N 5/022 |
| 2017/0147696 A1* | 5/2017 | Evnine | G06F 16/9535 |
| 2017/0177703 A1* | 6/2017 | Liu | G06F 16/285 |
| 2017/0300534 A1 | 10/2017 | Fu et al. | |
| 2017/0357904 A1* | 12/2017 | Adler | G06Q 10/109 |
| 2018/0089541 A1* | 3/2018 | Stoop | G06K 9/6277 |
| 2018/0089542 A1* | 3/2018 | Stoop | G06K 9/6277 |
| 2018/0232461 A1* | 8/2018 | Fu | G06F 16/90344 |
| 2018/0357434 A1* | 12/2018 | Roy | G06F 21/6209 |
| 2019/0057102 A1* | 2/2019 | Grant | G06F 16/9535 |
| 2019/0130073 A1* | 5/2019 | Sun | G06K 9/6223 |
| 2019/0163741 A1* | 5/2019 | Buckwalter | G06F 16/9535 |
| 2019/0213601 A1* | 7/2019 | Hackman | G06N 3/088 |
| 2019/0228321 A1* | 7/2019 | Chalmers | G06K 9/6218 |
| 2019/0236187 A1* | 8/2019 | Fitchett | G06F 16/9024 |
| 2019/0251169 A1* | 8/2019 | Loghmani | G06F 40/295 |
| 2020/0026908 A1* | 1/2020 | Henderson | G06N 3/0445 |
| 2020/0073944 A1* | 3/2020 | Mishra | G06F 40/247 |
| 2020/0082810 A1* | 3/2020 | Kneller | G06N 5/047 |
| 2020/0089765 A1* | 3/2020 | Jayaraman | G06F 16/35 |
| 2020/0104361 A1* | 4/2020 | Zarrella | G06N 20/00 |

OTHER PUBLICATIONS

Hemachandra, S. et al. (2015) "Learning Models for Following Natural Language Directions in Unknown Environments," Robotics and Automation (ICRA) IEEE International Conference, May 26-30, Seattle, Washington; pp. 5608-5615.

Miller, S. et al. (2004) "Name Tagging With Word Clusters and Discriminative Training," Proceedings of the Human Language Technology Conference of the North American Chapter of the Association for Computational Linguistics, HLT-NAACL, May 2-7, Boston, Massachusetts; 6 Pages.

Vasardani, M. et al. (Dec. 2013). "Locating Place Names from Place Descriptions," International Journal of Geographical Information Science, 27(12): 2509-2532.

* cited by examiner

MACHINE LEARNING OF COLLOQUIAL PLACE NAMES

FIELD OF THE INVENTION

This disclosure relates generally to machine learning of geographic place names, and, particularly, to machine learning to associate related colloquial geographic place names.

BACKGROUND OF THE INVENTION

As access to geographic location information has increased in recent years with improved global positioning system (GPS), location services, and other location identification technologies, so too has the variety of applications and uses for this geographic information. Governments, law enforcement, companies, and researchers have all found ways to harness this location information to better serve their interests. However, this location data is all based on information that does not take into account user input. For example, some social media platforms allow users to input their location when publishing a post by choosing a pre-loaded location, tagging the post, and/or textually providing location information. The above-described location data does not consider this user-inputted location information.

However, users often use unofficial descriptors when identifying their location. For example, a user may refer to New York City using numerous different colloquial terms such as New York, N.Y.; The Big Apple: NYC; New York; The City That Never Sleeps; etc. Colloquial terms that a user may use to indicate that he is located in New York City include New Yorker; Yankee; and Knickerbocker.

Currently, there are systems available that can harvest this user-inputted colloquial geographic information by sorting and associating like-terms together. For example, such systems may categorically sort and associate terms such as "New Yorker", "Bostonian", "Washingtonian", and "Chicagoan". Other terms that may be grouped together include "NYC", "BOS", "DC", and "CHI". In both examples, the terms all categorically refer to their respective city in a similar way.

SUMMARY OF THE INVENTION

Provided are systems, methods, and techniques for learning, grouping, interpreting, and suggesting colloquial place names. The provided systems, methods, and techniques can be used to identify a geographic location of a user based on that user's input of a colloquial place name. Unlike methods that use GPS, location services, or other location identification technologies, the methods provided herein do not utilize geographic-based data. The methods provided use colloquial terminology that a user has chosen to associate with a geographic location. Methods provided also categorize the various colloquial names based on an official (i.e., non-colloquial) geographic location (e.g., New York City, Washington, D.C., Chicago, etc.) instead of categorizing the colloquial names categorically based on the terminology (as in the example described above). Accordingly, provided herein are methods that may be used to search, map, or otherwise interpret noisy colloquial place names.

Proper handling (e.g., learning, grouping, interpreting, and suggesting) of place names is important for at least mapping and identity-matching techniques. In some embodiments, methods provided herein may improve the proper handling required in such applications. Other examples that can benefit from a more accurate method of handling place names include geographic searching of social media users and cognitive assists (i.e., Apple Inc.'s Siri). Methods provided herein may improve the handling of colloquial place names and allow other applications to benefit from the improved handling.

A relational database can be developed based on a longitudinal sampling of users' social media metadata (e.g., colloquial place names). Methods provided herein can develop the relational database by applying an algorithm to the colloquial place names (for example, a word-embedding algorithm) to assign a vector to each unique colloquial place name. Vectors can be assigned to colloquial place names based on similarity to one another. For example, as described above, a relational database may include vectors in a vector space that are associated with colloquial place names such that a vector for "The Big Apple" and a vector for "NYC" are "closer" to each other in the vector space than the vector for "NYC" and a vector for "Beantown".

Methods according to embodiments provided herein can be used for various applications. For example, one can query the relational database to identify colloquial place names associated with a given geographic location. Or, one may have a colloquial place name, e.g., Beantown, and use the learned database to identify other colloquial place names that are similar.

In some embodiments, a database of colloquial place names may be provided. The database may be populated with historical data based on various terms different people use to refer to themselves based on their geographic location. In some embodiments, this database may learn how to interpret and group the colloquial place names based on geographic location. Once the database learns colloquial place names, a user may use the database to identify similar colloquial place names to a given term.

Methods provided herein may be used in various applications. For example, relational databases may be used to identify colloquial place names associated with a particular geographic location, which may in turn be used to identify geographic trends, data, etc. Another use of methods provided herein may include geotagging. Geotagged online social network data may include photographs and/or videos, for example. Methods provided herein may be used to identify colloquial place names associated with a particular geographic location, which may in turn be used to identify specific geotagged online social network data corresponding to the particular geographic location.

In some embodiments, a method of identifying relationships between colloquial place names in a relational database is provided, the method comprising: receiving geographic location information; generating a geographic location information vector corresponding to the geographic location; comparing the geographic location information vector corresponding to the geographic location to a plurality of colloquial place name vectors in a relational database that maps a plurality of colloquial place names to a plurality of corresponding colloquial place name vectors in a vector space, wherein each colloquial place name vector represents one or more words associated with each colloquial place name, to generate a plurality of similarity scores that is calculated based on the geographic location information vector and each colloquial place name vector of the plurality of colloquial place name vectors; and identifying that one or more colloquial place names in the relational database are related to the geographic location information based on the plurality of similarity scores.

In some embodiments of the method of identifying relationships between colloquial place names in a relational database, the method comprises outputting the one or more colloquial place names related to the geographic location information based on the similarity score onto a display.

In some embodiments of the method of identifying relationships between colloquial place names in a relational database, the method comprises storing the similarity score calculated based on the geographic location information vector and each colloquial place name vector of the plurality of colloquial place name vectors in the relational database.

In some embodiments of the method of identifying relationships between colloquial place names in a relational database, the method comprises updating the relational database based on the geographic location information and the similarity score between the geographic location information vector and each colloquial place name vector of the plurality of colloquial place name vector.

In some embodiments of the method of identifying relationships between colloquial place names in a relational database, each colloquial place name vector of the plurality of colloquial place name vectors is generated by word-embedding one or more words associated with a colloquial place name of the plurality of colloquial place names, wherein a first colloquial place name vector represents a first colloquial place name and a second colloquial place name vector represents a second colloquial place name.

In some embodiments of the method of identifying relationships between colloquial place names in a relational database, the similarity score is calculated between the geographic location information vector and each colloquial place name vector by calculating a cosine similarity between the geographic location information vector and each colloquial place name vector located in the vector space.

In some embodiments of the method of identifying relationships between colloquial place names in a relational database, for each user account of a plurality of user accounts, receiving a plurality of colloquial place names associated with each user account; and inputting the plurality of colloquial place names associated with each user account into a word-embedding algorithm to generate a mapping of the plurality of colloquial place names to the plurality of corresponding colloquial place name vectors, wherein the plurality of colloquial place name vectors corresponds to the plurality of colloquial place names.

In some embodiments of the method of identifying relationships between colloquial place names in a relational database, the word-embedding algorithm comprises one of word2vec, GloVe, or FastText.

In some embodiments, a method of generating a relational database of colloquial place names is provided, the method comprising receiving metadata comprising a plurality of colloquial place names, wherein a first plurality of colloquial place names of the plurality of colloquial place names corresponds to a first user and a second plurality of colloquial place names of the plurality of colloquial place names corresponds to a second user, and wherein each colloquial place name of the plurality of colloquial place names is associated with one or more words; concatenating the one or more words associated with each colloquial place name of the first plurality of colloquial place names to generate a first sequence corresponding to the first user; concatenating the one or more words associated with each colloquial place name of the second plurality of colloquial place names to generate a second sequence corresponding to the second user; applying a word-embedding algorithm to the first sequence and the second sequence to generate a vector space comprising a vector corresponding to each of the one or more words associated with each colloquial place name of the first plurality of colloquial place names and a vector corresponding to each of the one or more words associated with each colloquial place name of the second plurality of colloquial place names, wherein a first vector corresponding to a first colloquial place name of the first plurality of colloquial place names is located a first distance from a second vector corresponding to a second colloquial place name of the first plurality of colloquial place names in the vector space, and the first vector is located a second distance from a third vector corresponding to a third colloquial place name of the second plurality of colloquial place names, wherein the second distance is greater than the first distance; and storing the vector space into a relational database of colloquial place names.

In some embodiments of the method of generating a relational database of colloquial place names, the third vector corresponding to a third colloquial place name of the second plurality of colloquial place names is located a third distance from a fourth vector corresponding to a fourth colloquial place name of the second plurality of colloquial place names in the vector space, and the third vector is located a fourth distance from the second vector corresponding to a second colloquial place name of the first plurality of colloquial place names in the vector space, wherein the fourth distance is greater than the third distance.

In some embodiments of the method of generating a relational database of colloquial place names, the first distance is determined by calculating a Euclidean distance between the first vector corresponding to the first colloquial place name of the first plurality of colloquial place names and the second vector corresponding to the second colloquial place name of the first plurality of colloquial place names and the second distance is determined by calculating a Euclidean distance between the first vector and the third vector corresponding to a third colloquial place name of the second plurality of colloquial place names.

In some embodiments of the method of generating a relational database of colloquial place names, the third distance is determined by calculating a Euclidean distance between the third vector corresponding to the third colloquial place name of the second plurality of colloquial place names and the fourth vector corresponding to the fourth colloquial place name of the second plurality of colloquial place names and the fourth distance is determined by calculating a Euclidean distance between the third vector and the second vector corresponding to a second colloquial place name of the first plurality of colloquial place names in the vector space.

In some embodiments of the method of generating a relational database of colloquial place names, the word-embedding algorithm comprises one of word2vec, GloVe, or FastText.

In some embodiments of the method of generating a relational database of colloquial place names, the metadata comprises a plurality of colloquial place names associated with a plurality of users of a social media platform, and wherein two or more colloquial place names of the plurality of colloquial place names are associated with each user of the plurality of users.

In some embodiments of the method of generating a relational database of colloquial place names, each colloquial place name of the first plurality of colloquial place names corresponding to the first user correspond to a first geographic location and each colloquial place name of the second plurality of colloquial place names corresponding to the second user correspond to a second geographic location.

In some embodiments of the method of generating a relational database of colloquial place names, the one or more words associated with each colloquial place names of the plurality of colloquial place names comprises one or more of a letter of an alphabet, a numeral, a symbol, a punctuation, or an emoji.

In some embodiments of the method of generating a relational database of colloquial place names, the method comprises applying a de-duplication algorithm to the first sequence and the second sequence to eliminate from the metadata any duplicate colloquial place names associated with a single user; applying a tokenizing algorithm to the first sequence and the second sequence to identify and insert boundaries into the one or more words associated with each colloquial place name; and applying a phrase-identifying algorithm to the first sequence and the second sequence to identify one or more words that comprise a multi-word phrase.

In some embodiments, a system for identifying relationships between colloquial place names in a relational database is provided, the system comprising one or more processors and memory storing one or more programs that when executed by the one or more processors cause the one or more processors to: receive geographic location information; generate, based on the geographic location information, a vector corresponding to the geographic location; compare the geographic location information vector corresponding to the geographic location to a plurality of colloquial place name vectors in a relational database that maps a plurality of colloquial place names to a plurality of corresponding colloquial place name vectors in a vector space, wherein each colloquial place name vector represents one or more words associated with each colloquial place name, to generate a plurality of similarity scores that is calculated based on the geographic location information vector and each colloquial place name vector of the plurality of colloquial place name vectors; and identify that one or more colloquial place names in the relational database are related to the geographic location information based on the plurality of similarity scores.

In some embodiments of the system for identifying relationships between colloquial place names in a relational database, the system comprises output the one or more colloquial place names related to the geographic location information based on the similarity score onto a display.

In some embodiments of the system for identifying relationships between colloquial place names in a relational database, the system comprises store the similarity score calculated based on the geographic location information vector and each colloquial place name vector of the plurality of colloquial place name vectors in the relational database.

In some embodiments of the system for identifying relationships between colloquial place names in a relational database, the system comprises update the relational database based on the geographic location information and the similarity score between the geographic location information vector and each colloquial place name vector of the plurality of colloquial place name vector.

In some embodiments of the system for identifying relationships between colloquial place names in a relational database, each colloquial place name vector of the plurality of colloquial place name vectors is generated by word-embedding one or more words associated with a colloquial place name of the plurality of colloquial place names, wherein a first colloquial place name vector represents a first colloquial place name and a second colloquial place name vector represents a second colloquial place name.

In some embodiments of the system for identifying relationships between colloquial place names in a relational database, the system comprises the similarity score is calculated between the geographic location information vector and each colloquial place name vector by calculating a cosine similarity between the geographic location information vector and each colloquial place name vector located in the vector space.

In some embodiments of the system for identifying relationships between colloquial place names in a relational database, the system comprises for each user account of a plurality of user accounts, receive a plurality of colloquial place names associated with each user account; and input the plurality of colloquial place names associated with each user account into a word-embedding algorithm to generate a mapping of the plurality of colloquial place names to the plurality of corresponding colloquial place name vectors, wherein the plurality of colloquial place name vectors corresponds to the plurality of colloquial place names.

In some embodiments of the system for identifying relationships between colloquial place names in a relational database, the word-embedding algorithm comprises one of word2vec, GloVe, or FastText.

In some embodiments, a system for generating a relational database of colloquial place names is provided, the system comprising: one or more processors and memory storing one or more programs that when executed by the one or more processors cause the one or more processors to: receive metadata comprising a plurality of colloquial place names, wherein a first plurality of colloquial place names of the plurality of colloquial place names corresponds to a first user and a second plurality of colloquial place names of the plurality of colloquial place names corresponds to a second user, and wherein each colloquial place name of the plurality of colloquial place names is associated with one or more words; concatenate the one or more words associated with each colloquial place name of the first plurality of colloquial place names to generate a first sequence corresponding to the first user; concatenate the one or more words associated with each colloquial place name of the second plurality of colloquial place names to generate a second sequence corresponding to the second user; apply a word-embedding algorithm to the first sequence and the second sequence to generate a vector space comprising a vector corresponding to each of the one or more words associated with each colloquial place name of the first plurality of colloquial place names and a vector corresponding to each of the one or more words associated with each colloquial place name of the second plurality of colloquial place names, wherein a first vector corresponding to a first colloquial place name of the first plurality of colloquial place names is located a first distance from a second vector corresponding to a second colloquial place name of the first plurality of colloquial place names in the vector space, and the first vector is located a second distance from a third vector corresponding to a third colloquial place name of the second plurality of colloquial place names, wherein the second distance is greater than the first distance; and store the vector space into a relational database of colloquial place names.

In some embodiments of the system for generating a relational database of colloquial place names, the third vector corresponding to a third colloquial place name of the second plurality of colloquial place names is located a third distance from a fourth vector corresponding to a fourth colloquial place name of the second plurality of colloquial place names in the vector space, and the third vector is located a fourth distance from the second vector corresponding to a second colloquial place name of the first plurality of colloquial place names in the vector space, wherein the fourth distance is greater than the third distance.

In some embodiments of the system for generating a relational database of colloquial place names, the first distance is determined by calculating a Euclidean distance between the first vector corresponding to the first colloquial place name of the first plurality of colloquial place names and the second vector corresponding to the second colloquial place name of the first plurality of colloquial place names and the second distance is determined by calculating a Euclidean distance between the first vector and the third vector corresponding to a third colloquial place name of the second plurality of colloquial place names.

In some embodiments of the system for generating a relational database of colloquial place names, the third distance is determined by calculating a Euclidean distance between the third vector corresponding to the third colloquial place name of the second plurality of colloquial place names and the fourth vector corresponding to the fourth colloquial place name of the second plurality of colloquial place names and the fourth distance is determined by calculating a Euclidean distance between the third vector and the second vector corresponding to a second colloquial place name of the first plurality of colloquial place names in the vector space.

In some embodiments of the system for generating a relational database of colloquial place names, the word-embedding algorithm comprises one of word2vec, GloVe, or FastText.

In some embodiments of the system for generating a relational database of colloquial place names, the metadata comprises a plurality of colloquial place names associated with a plurality of users of a social media platform, and wherein two or more colloquial place names of the plurality of colloquial place names are associated with each user of the plurality of users.

In some embodiments of the system for generating a relational database of colloquial place names, each colloquial place name of the first plurality of colloquial place names corresponding to the first user correspond to a first geographic location and each colloquial place name of the second plurality of colloquial place names corresponding to the second user correspond to a second geographic location.

In some embodiments of the system for generating a relational database of colloquial place names, the one or more words associated with each colloquial place names of the plurality of colloquial place names comprises one or more of a letter of an alphabet, a numeral, a symbol, punctuation, or an emoji.

In some embodiments of the system for generating a relational database of colloquial place names, the system comprises apply a de-duplication algorithm to the first sequence and the second sequence to eliminate from the metadata any duplicate colloquial place names associated with a single user; apply a tokenizing algorithm to the first sequence and the second sequence to identify and insert boundaries into the one or more words associated with each colloquial place name; and apply a phrase-identifying algorithm to the first sequence and the second sequence to identify one or more words that comprise a multi-word phrase.

BRIEF DESCRIPTION OF THE DRAWINGS

The invention will now be described, by way of example only, with reference to the accompanying drawings, in which.

DETAILED DESCRIPTION OF THE INVENTION

Figure 1:
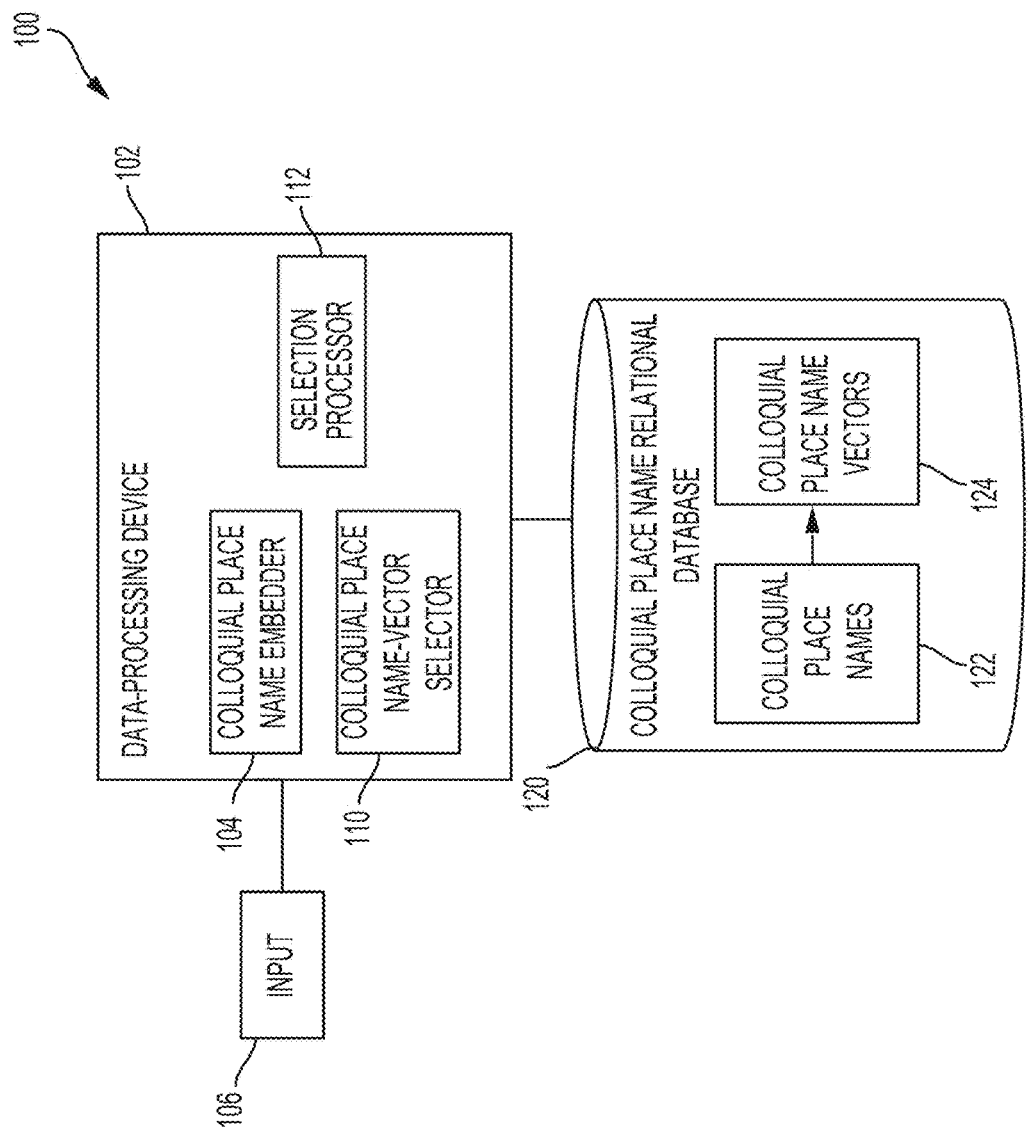
FIG. 1 illustrates a system for identifying colloquial place names, according to some embodiments.

Described are exemplary embodiments of systems, methods, and techniques for developing relational databases of colloquial place names. These relational databases may then be used to interpret and suggest colloquial place names based on various input values. Many current relational databases including location information are based on official geographic locations instead of colloquial place names. Some current relational databases including location information that are based on colloquial place names associate two colloquial place names categorically instead of geographically. (For example, categorically-grouped colloquial place name relational databases may be used to predict that "Michiganer" is more similar to "Californian" (both terms describe a person from a state) than it is to "Mitten State" (a term identifying a state). Conversely, geographically-grouped colloquial place names according to embodiments herein can be used to predict that "Michiganer" is more similar to "Mitten State" (both terms are related to the same state) than it is to "Californian.") Embodiments described herein are directed to developing a relational database of colloquial place names mapped to vectors that are generated based on geographic location. By associating colloquial place names with each other based on input data, a relational database developed according to embodiments described herein may be able to interpret a colloquial place name, identify similar colloquial place names based on geographic location, and/or colloquial place names based on an input value.

As described below, a longitudinal sampling of metadata can be obtained from social media platforms. The metadata can comprise geographic location information associated with a plurality of users over a period of time. Some social media platforms permit users to freely input geographic location information instead of identifying a geographic location provided in a populated list. For example, on some social media platforms, users can input any string of letters, numerals, punctuation, and/or emojis into a field associated with their user account or user profile. Accordingly, many users choose to input nicknames, or colloquial place names, to identify a geographic location. A user may choose to provide "The Mile High City" or "DEN" (colloquial place names associated with Denver, Colo.) instead of identifying "Denver, Colo." specifically. This presents challenges for anyone wishing to identify relationships between geographically-related colloquial place names.

However, it has been determined that the various colloquial place names associated with a single user are related in some meaningful way. For example, a user may move to various different towns or neighborhoods all within a greater geographic region. Another user may change the colloquial place name used to identify a location as he ages (i.e., progresses from high school, to college, and into adulthood). In some cases, a user may move from one geographic location to a different, yet similar, geographic location. For example, a user may move from Boston, Mass. to Philadelphia, Pa. or from Des Moines, Iowa to Lincoln, Nebr. In some embodiments, new colloquialisms may become associated with a geographic location over time due to changes in popular culture. For example, a user may change his or her stated place name from "Cleveland" to "Believeland" in response to a local sports team's success. Thus, by using these relationships between colloquial place names associated with each individual user, relational databases can be developed, described in detail below. A relational database based on these relationships between colloquial place names can then be used to identify relationships between given geographic location information and the colloquial place names provided in the relational database, also provided below.

Methods for developing a relational database including colloquial place names can include automatically learning from input data a similarity between different terms. For example, people can refer to Chicago as "Chi-town" or "The Windy City" and may refer to a person from Chicago as a "Chicagoan". Systems according to embodiments provided herein can learn that the terms Chicago, Chi-town, The Windy City, and Chicagoan are all referring to contextually similar geographic locations—as well as a non-colloquial term such as Chicago, Ill.—and associate these terms by assigning vectors to each term accordingly.

In some embodiments, a system can be configured to identify one or more colloquial place names associated with a geographic location using a relational database (e.g., the colloquial place name "Beantown" may be associated with the geographic location "Boston, Mass."). In some embodiments, a system can be configured to identify one or more colloquial places name similar to a colloquial place name provided by a user using a relational database (e.g., a user may input "DEN" and the colloquial place names "Denver", "Mile High City", and "5280" may be identified as similar to "DEN"). These identification functions can be performed with high accuracy by using a relational database that embeds a plurality of colloquial place names into a vector space wherein each colloquial place name is embedded as a corresponding positional vector in a vector space. To embed the plurality of names, a system can be configured to implement word-embedding in which related colloquial place names are embedded as "closer" (or "nearby") positional vectors (e.g., a representation for a point) in the vector space. "Closer" positional vectors can be quantified by a distance metric (e.g., a Euclidean distance, a Pearson correlation, a Minkowski distance, etc.) such that a first positional vector can be closer to a second positional vector if the distance between the first and second positional vectors is less than that between the first and a third positional vector.

In some embodiments, the embedded colloquial place names can be stored in the relational database as associations between a plurality of colloquial place names and a plurality of corresponding colloquial place name vectors, wherein each colloquial place name vector can be a positional vector in the vector space and associated with one or more words associated with each colloquial place name.

FIG. 1 illustrates a system 100 for selecting one or more colloquial place names that correspond to an input value, according to some embodiments. System 100 includes a data-processing device 102 communicatively coupled to a colloquial place name relational database 120. In some embodiments, data-processing device 102 can be implemented on one or more virtual machines, servers, hardware appliance, general-purpose computers, or a combination thereof. In some embodiments, data-processing device 102 can be communicatively coupled to a user client such as a mobile device or a personal laptop to enable users to access the colloquial place name identifying functionality provided by data-processing device 102. In some embodiments, data-processing device 102 can be coupled to the client device via a network that includes a local area network (LAN), a wide area network (WAN), the Internet, a Wi-Fi network, a WiMAX network, a cellular network (e.g., 3G, 4G, 4G Long Term Evolution (LTE)), or a combination thereof. Further, the network may implement one or more wired and/or wireless standards or protocols.

In some embodiments, colloquial place name relational database 120 can be configured to store associations between a plurality of colloquial place names 122 and a plurality of corresponding colloquial place name vectors 124. In some embodiments, colloquial place name relational database 120 can be configured to store the associations in a database, such as a relational database that stores associations in one or more tables. In some embodiments, data-processing device 102 can be configured to embed the plurality of colloquial place names 122 into a vector space including the plurality of colloquial place name vectors 124. The embedding process includes converting a colloquial place name into a positional vector in the vector space, in which the positional vector corresponds to the colloquial place name vector and can be an n-dimensional vector where n corresponds to a number of elements in the colloquial place name vector. The colloquial place name vector can be a binary vector in which each element is a binary value (e.g., 0 or 1), an integer vector in which each element is an integer, or a real-valued vector in which each element can be represented by, e.g., a double data type.

In some embodiments, data-processing device 102 can be configured to perform the colloquial place name embedding process using character embedding, n-gram embedding, or word-embedding. In some embodiments, character embedding includes associating each character of a colloquial place name with a vector and generating a colloquial place name vector having a fixed width (e.g., being n elements) by inputting each of the vectors into a neural network (e.g., a recurrent neural network). In some embodiments, n-gram embedding includes projecting a colloquial place name onto a vector based on unigrams (one character), bigrams (two contiguous characters), n-grams (n contiguous characters), or a combination thereof in the name. Then, the resulting vector of the n-gram embedding can be compressed to a fixed-size colloquial place name vector having n elements. For example, the resulting vector may be hashed into the fixed-size colloquial place name vector. In some embodiments, as will be further described with respect to FIG. 2, word-embedding includes embedding related place names as "closer" positional vectors in a vector space.

In some embodiments, data-processing device 102 can be configured to implement word-embedding to embed colloquial place names 122 into a vector space including a plurality of colloquial place name vectors 124 where each of colloquial place names 122 can be stored in association with a unique colloquial place name vector of real numbers. For example, a colloquial place name and a corresponding colloquial place name vector may be stored in the same entry of a table in the relational database. In some embodiments, the colloquial place name vector can be an n-dimensional vector where n corresponds to a number of elements in each name vector. In some embodiments, the colloquial place name vector used to represent a colloquial place name can be associated with a plurality of words associated with that colloquial place name, which is further described below with respect to FIG. 2.

In some embodiments, colloquial place name embedder 104 can be configured to generate colloquial place name relational database 120 by word-embedding a word or a plurality of words associated with each colloquial place name into a vector space used to represent colloquial place names. For example, each colloquial place name may be converted into a colloquial place name vector in the vector space where the colloquial place name vector includes a plurality of real values. In some embodiments, colloquial place name embedder 104 receives information related to user accounts of social media to perform word-embedding. For example, colloquial place name embedder 104 may perform word-embedding on a plurality of metadata associated with each user account, as will be further described below with respect to FIG. 2. In some embodiments, colloquial place name embedder 104 can be configured to run a word-embedding algorithm such as Word2Vec or GloVe.

In some embodiments, selection processor 112 can be configured to select one or more colloquial place name from a plurality of colloquial place names 122 based on input value 106 received at data-processing device 102. For example, input value 106 may include a non-colloquial geographic location or a colloquial place name. Using this input value, the relational database may be used to select one or more colloquial place names associated with input value 106. In some embodiments, the one or more selected colloquial place names may identify nicknames, words, phrases, or another string of text. In some embodiments, a colloquial place name may include letters, numbers, punctuation, symbols, and/or emojis.

In some embodiments, upon receiving input value 106, data-processing device 102 can be configured to generate an input value vector corresponding to the input value. Data-processing device 102 can then be configured to calculate a plurality of similarity scores between the input value vector and a plurality of colloquial place name vectors corresponding to the plurality of colloquial place names. Each similarity score may quantify a similarity between the input value vector and one or more colloquial place name vectors. In some embodiments, a higher similarity score may indicate greater similarity in which case a colloquial place name vector having the highest score from the plurality of similarity scores and associated with a colloquial place name may be determined to be similar to the input value. In some embodiments, a high similarity score corresponds to a shorter distance calculated between vectors, in which case a colloquial place name vector being selected is predicted to correspond to the input value and may be associated with the shortest distance to the input value vector as compared to the distance between the input value vector and each of the other colloquial place name vectors from the plurality of colloquial place name vectors.

In some embodiments, colloquial place name-vector selector 110 can be configured to select a colloquial place name vector based on a colloquial place name by searching name relational database 120. For example, when name relational database 120 is configured as a database that stores mappings between colloquial place names 122 and corresponding colloquial place name vectors 124, colloquial place name-vector selector 110 may query the database for the colloquial place name vector associated with the colloquial place name. As described above, the selected colloquial place name vector includes representations (e.g., real numbers) associated with one or more words or characters (e.g., colloquial place names) associated with the colloquial place name.

Figure 2:
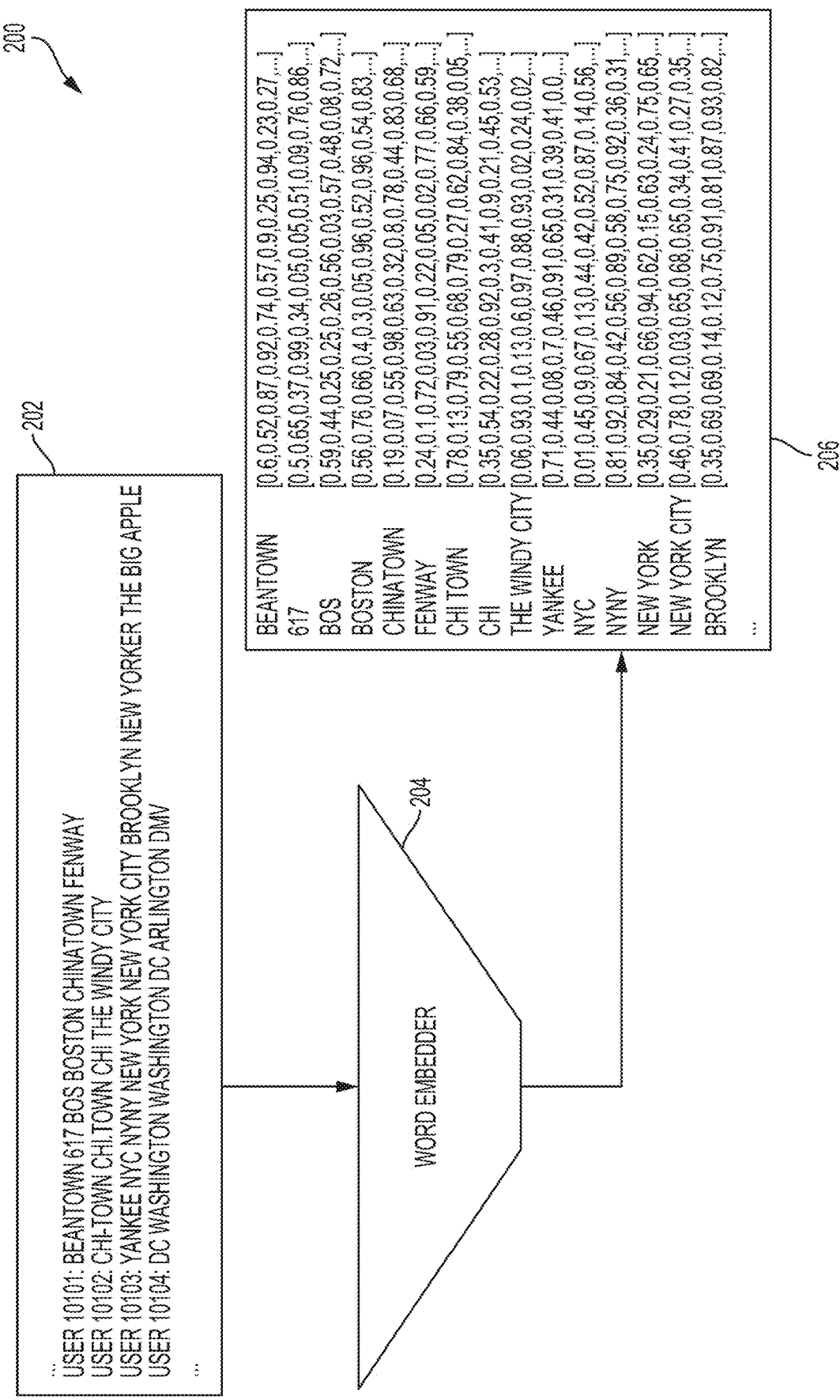
FIG. 2 illustrates a diagram showing how an example colloquial place name relational database may be generated, according to some embodiments.

FIG. 2 illustrates a diagram 200 showing the generation of an example colloquial place name relational database 206 according to some embodiments. Word embedder 204 (e.g., colloquial place name embedder 104 of FIG. 1) can be configured to apply a word-embedding algorithm to embed colloquial place names in input relational database 202 into vector representations, as shown in colloquial place name relational database 206. For example, the word-embedding algorithm may include Word2Vec, GloVe, FastText, or any other suitable word-embedding algorithm. In general, word-embedding algorithms such as Word2Vec and GloVe can implement neural networks to generate fixed-dimensional vector summaries of word traits such as syntactic and semantic categories based on a large set of documents. These neural networks may be configured to optimize the ability of a generated vector for a word to correctly predict language phenomena within the local area of occurrence (e.g., within a sentence or a window of a fixed number of words) of that word. As further described below, input relational database 202 can be configured to include sets of colloquial place names associated with a given geographic location.

By taking advantage of the optimization functionality of word-embedding algorithms, word embedder 204 may be configured to word embed associated colloquial place names as corresponding colloquial place name vectors that are "close" to each other in the colloquial place name vector space according to some embodiments. In particular, a first plurality of words (e.g., a plurality of colloquial place names associated with a first user account) may all be related to a first geographic location (e.g., Boston, Mass.). A second plurality of words (e.g., a second plurality of colloquial place names associated with a second user account) may all be related to a second geographic location (e.g., Chicago, Ill.). A third plurality of words (e.g., a third plurality of colloquial place names associated with a third user account) may all be related to a third geographic location (e.g., New York, N.Y.). A fourth plurality of words (e.g., a fourth plurality of colloquial place name associated with a fourth user account) may all be related to a fourth geographic location (e.g., Washington, D.C.).

An implicit assumption is that one or more words corresponding to one or more colloquial place name and associated with any given single user account are related to one another in some meaningful way. For example, a user may move to various different towns or neighborhoods all within a greater geographic region. Another user may change the colloquial place name used to identify a location as he ages (i.e., progresses from high school, to college, and into adulthood). In some cases, a user may move from one geographic location to a different, yet similar, geographic location. For example, a user may move from Boston, Mass. to Philadelphia, Pa. or from Des Moines, Iowa to Lincoln, Nebr. The similarities between the various colloquial place names and their corresponding geographic locations in the examples above can all provide meaningful information that can be incorporated by methods provided to account for similarities and differences between various colloquial place names.

In some cases, one or more words corresponding to two or more related colloquial place names may be associated with a single user account. For example, a user may move from Boston, Mass. to Des Moines, Iowa, which are two different places with little in common geographically. However, this may only be a single data point in the entire input data. Other user accounts from the longitudinal sample may include colloquial place names associated with Boston, Mass. Similarly, other user accounts in the input data from the longitudinal sample may include colloquial place names associated with Des Moines, Iowa. The word-embedding algorithm may be able to generate a Beantown vector that is "closer" to a BOS vector in a vector space than it is to a Des Moines vector, even though the colloquial place names "Beantown" and "Des Moines" are associated with the same user account. However, the word-embedding algorithm may account for the association of these colloquial place names with other user accounts as well. For example, the colloquial place name "Beantown" may also be associated with a user account that also includes the colloquial place names of "Fenway", "617", and "Bostonian". Similarly, the colloquial place name "Des Moines" may also be associated with a user account that includes the colloquial place names of "IA", "The Hawkeye State", and "DSM", all nicknames or abbreviations referring to Des Moines or Iowa generally. Accordingly, while the word-embedding algorithm will consider the relationship between "Beantown" and "Des Moines" based on their common association with a single user account, the word-embedding algorithm will also account for their presence in and association with other user accounts. In many cases, the presence of colloquial place names "Beantown" and "Des Moines" in other user accounts including more geographically-related colloquial place names will outweigh a single user account including both "Beantown" and "Des Moines", and thus, the word-embedding algorithm can generate a Beantown vector that is "closer" to "Fenway", "617", and "Bostonian" vectors, and a "Des Moines" vector that is "closer" to "IA", "The Hawkeye State", and "DSM" vectors in a vector space.

Similarly, a user account may include the colloquial place names: "Philly", "Chinatown", "Main Line", and "PA". However, colloquial place names such as "Chinatown" may have little more relation to Philadelphia than it does to any other city having a Chinatown neighborhood. Accordingly, the colloquial place name "Chinatown" would likely be present in the metadata of user accounts associated with a large variety of geographic locations. However, like the example provided above, a word-embedding algorithm can account for the associations between "Chinatown" and a plurality of various colloquial place names corresponding to different cities by generating vectors for "Chinatown" and the plurality of various colloquial place names accordingly.

Upon performing word-embedding on the words in each of the first plurality of words, second plurality of words, third plurality of words, fourth plurality of words, etc., colloquial place name embedder 204 may generate a first plurality of colloquial place name vectors for all unique words and/or phrases from relational database 202 of which the vectors corresponding to the first plurality of colloquial place name vectors will be closer to each other than, for example, vectors between the first and second plurality of place names. For example, vectors for "Beantown" and "617" (both from the first plurality of colloquial place names) will be closer to each other than vectors for "Beantown" (from the first plurality) and "Yankee" (from the third plurality).

In some embodiments, input relational database 202 includes a longitudinal sample of a plurality of metadata from user accounts of a social media platform. This metadata can include various words associated with each particular user account at various points in time. In some embodiments, the words associated with each user account can include colloquial place names. Further, the "words" may include letters, punctuation, symbols, emoji, and/or other characters. For example, input relational database 202 may include for user 10101 the following colloquial place names: Beantown, 617, BOS, Boston, Chinatown, and Fenway (617 referring to the local area code). In another example, input relational database 202 may include for user 10104 the following colloquial place names: DC, Washington, Washington D.C., Arlington, and DMV.

In some embodiments, input relational database 202 includes a plurality of metadata associated with a plurality of users and the metadata can include a plurality of words associated with each user. Each of the words may be a colloquial place name associated with that user. For example, as shown in the examples provided above, the words may refer to a user's city of residence or hometown, a common abbreviation referring to a geographic region associated with a user (e.g., DMV which stands for "DC-Maryland-Virginia"), an area code or zip code of a user, an airport code (e.g., BOS), nicknames for a geographic area associated with a user (e.g., Beantown, Washington), and/or a neighborhood within a specific geographic location (e.g., Chinatown, Fenway). In some embodiments, the colloquial place names associated with a user may be obtained by a longitudinal sampling of the metadata of social media platforms. In particular, some social media platforms allow users to manually input their location (as opposed to selecting a location from a populated list). Social media platforms allowing users to manually input their location can provide data for input relational database 202. Note that the precise geographic location of the user may be irrelevant. Methods provided are based on relationships between a given user's metadata (i.e., changes in colloquial place names over a period of time) which may or may not accurately portray a user's geographic location. For example, a user may choose to provide a colloquial place name associated with his hometown or the town of his alma mater, which may not accurately represent his geographic location at a given point in time.

In some embodiments, word embedder 204 can be configured to concatenate each plurality of words associated with each user account to generate a plurality of sequences corresponding to the plurality of user accounts. Then, word embedder 204 can be configured to apply the word-embedding algorithm on the plurality of sequences to generate colloquial place name relational database 206. As discussed above with respect to FIG. 1, word-embedding converts each colloquial place name from input relational database 202 into a vector representation in a vector space of n-dimensions. Each of the vector representations may be a positional vector (e.g., a representation of a point in the vector space) having n elements. In some embodiments, word-embedding embeds related colloquial place names into "closer" positional vectors in the vector space. For example, the positional vectors corresponding to "DMV" and "Washington" may be closer to each other than the positional vectors corresponding to, for example, "DMV" and "Beantown."

Before converting each colloquial place name from input relational database 202 into a vector representation as described above, various functions can be performed on the plurality of sequences to clean-up or otherwise simplify the data. In particular, the plurality of sequences can be processed through an algorithm to determine if any words may belong together as a phrase. For example, Word2Phrase, pointwise mutual information, or other suitable collocation detection algorithms may be used to learn phrases from the plurality of sequences. Words such as "The", "Windy", and "City" may be recognized by Word2Phrase as comprising a single colloquial place name—"The Windy City". By identifying which of the input words show up next to each other disproportionately frequently, phrases such as "The Windy City" may be identified in the plurality of sequences. Additionally, the plurality of sequences can be passed through a de-duplication process (or bloom filter) to identify and remove any duplications of user-colloquial place name pairings. For example, if all data points associated with a particular user from the longitudinal sample include "Philly" as a colloquial place name and nothing else, all but one data point (i.e., a user account-colloquial place name pairing) will be eliminated, since any data point in excess of one for this particular user will be a duplicate. In some embodiments, if a particular user only has a single colloquial place name after a de-duplication filter has been run on the data, that user may be eliminated from the data entirely. As discussed above, the word-embedding process, wherein a vector is generated and associated to each colloquial place name, is dependent upon changes in a user's colloquial place name. Thus, if a particular user has not changed his or her colloquial place name over the course of the longitudinal sampling, there cannot be any meaningful associations generated from that user's data, since they only have a data point associated with their user account.

Another function that may be performed on the plurality of sequences is a tokenizing function. In some cases, a colloquial place name may include punctuation, a symbol, or an emoji instead of a space. A tokenizing function can insert spaces where it identifies a word boundary. For example, "Los~Angeles" may be converted to "Los Angeles" and "The_Windy_City" to "The Windy City". Once any of the above-described and/or other similar functions have been performed on the plurality of sequences, the plurality of sequences can be processed by a word-embedding algorithm. Some word-embedding algorithms may include Word2Vec, GloVe, fastText, ELMo, Explicit Semantic Analysis (ESA), and other suitable algorithms.

Once a colloquial place name vector has been generated for each colloquial place name, the similarity between two different colloquial place name vectors associated with two respective colloquial place names can be calculated. As discussed above, the "closeness" between two vectors can be quantified by calculating a distance metric between the two vectors. For example, the distance metric may be calculated based on a Euclidean distance, a cosine distance, a Pearson correlation, a Manhattan distance, a Minkowski distance, etc. In each case, a smaller distance may indicate that two vectors are "closer" to each other in the vector space. For example, a first positional vector is closer to a second positional vector than a third positional vector if the distance between the first and second positional vector is less than that between the first and third positional vectors.

As shown in diagram 200, colloquial place name relational database 206 embeds the colloquial place names from each plurality of colloquial place names into a vector space where each colloquial place name can be associated with a unique colloquial place name vector, as shown in relational database 206. For example, the colloquial place name "Chi Town" is associated with the colloquial place name vector [0.78,0.13,0.79,0.55,0.68,0.79,0.27,0.62,0.84,0.38, 0.05, . . . ].

Figure 3:
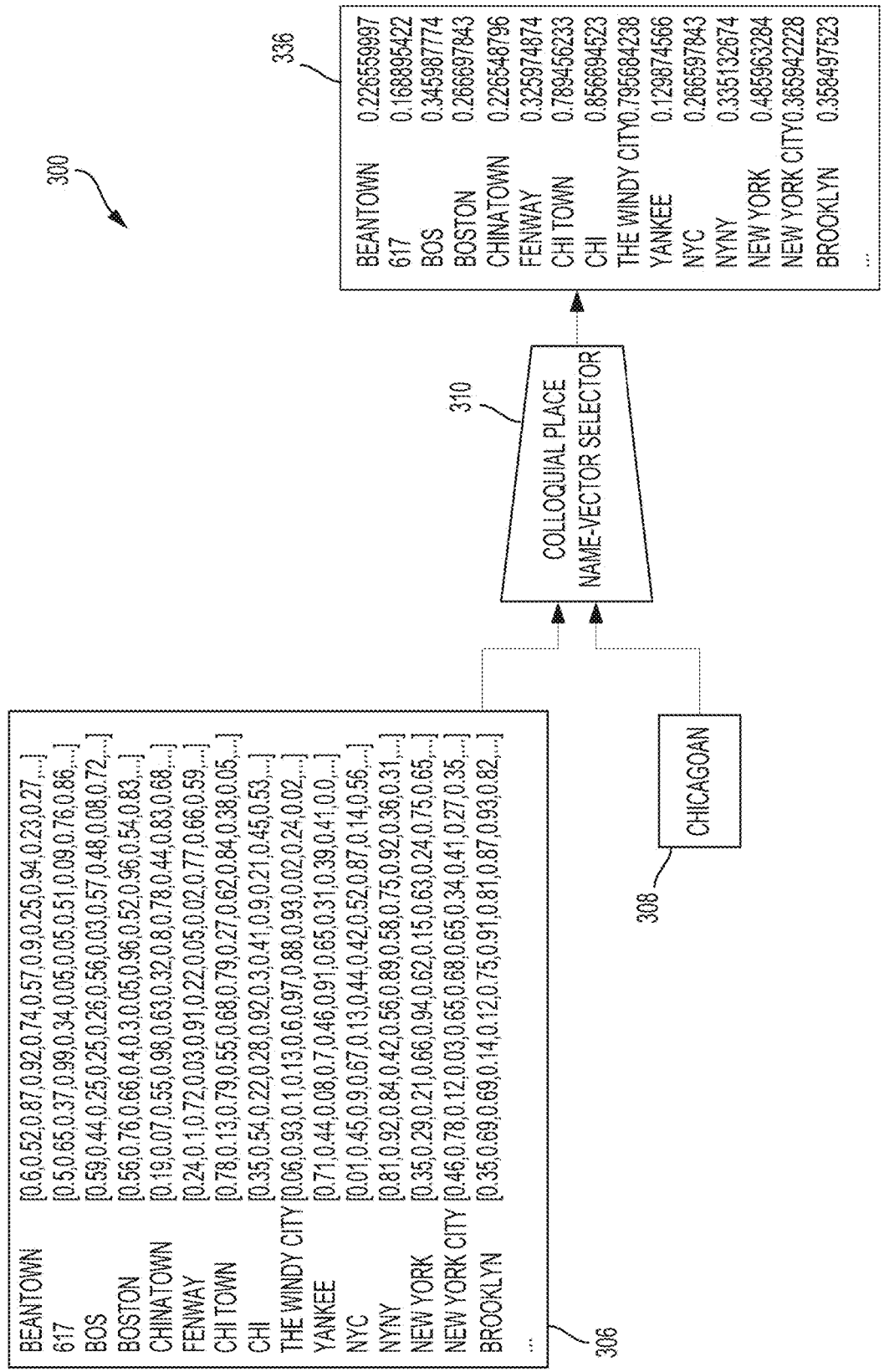
FIG. 3 illustrated a diagram showing how example relationships may be generated between colloquial place names in a relational database, according to some embodiments.

FIG. 3 illustrates a diagram showing process 300 for comparing vectors and generating a plurality of similarity scores according to some embodiments. Process 300 can include geographic location information 308, a relational database 306 comprising a plurality of colloquial place name vectors corresponding to a plurality of colloquial place names, colloquial place name-vector selector 310 (e.g., colloquial place name-vector selector 110 of FIG. 1), and a plurality of similarity scores 336.

Geographic location information 310 may be an input provided by a user. For example, geographic location information 310 may include a colloquial place name, an official (non-colloquial) geographic location, or any other geographic identifier (e.g., latitude, longitude, cardinal directions, etc.)

Relational database 306 (e.g., relational database 106 of FIG. 1) can comprise a plurality of colloquial place names. The plurality of colloquial place names may correspond to one or more words. A word-embedding algorithm can generate a vector corresponding to the one or more words of each of colloquial place name of the plurality of colloquial place names and can map the colloquial place name vectors to the colloquial place names in a vector space. This process is described in more detail with respect to FIG. 2, above.

The vector corresponding to geographic location information 308 can be compared to any or all of the colloquial place name vectors of the plurality of colloquial place name vectors corresponding to the plurality of colloquial place names. In some embodiments, the vector corresponding to geographic location information 308 can be compared by calculating a similarity score between the vector corresponding to geographic location information 308 and any or all of the colloquial place name vectors of the plurality of colloquial place name vectors corresponding to the plurality of colloquial place names. A similarity score can be calculated between the vector corresponding to geographic location information 308 and each of the colloquial place name vectors of the plurality of colloquial place names corresponding to the plurality of colloquial place names to generate plurality of similarity scores 336. For example, a similarity score can be generated by calculating a cosine similarity, a Euclidean distance, a Sorensen-Dice coefficient, Jaccard index, or any other suitable method for calculating the similarity between two vectors.

Once a plurality of similarity scores 336 have been calculated, one or more colloquial place names corresponding to one or more colloquial place name vectors may be identified as being "similar" or "related to" the geographic information. For example, one or more colloquial place names corresponding to the one or more colloquial place name vectors above a certain threshold value may be identified as "similar" to the geographic information. In some embodiments, the identified one or more colloquial place names can be outputted to a display and displayed to a user. In some embodiments, plurality of similarity scores 336 can be stored in the relational database. In some embodiments, the relational database can be updated based on geographic location information 308 and the plurality of similarity scores 336.

Figure 4:
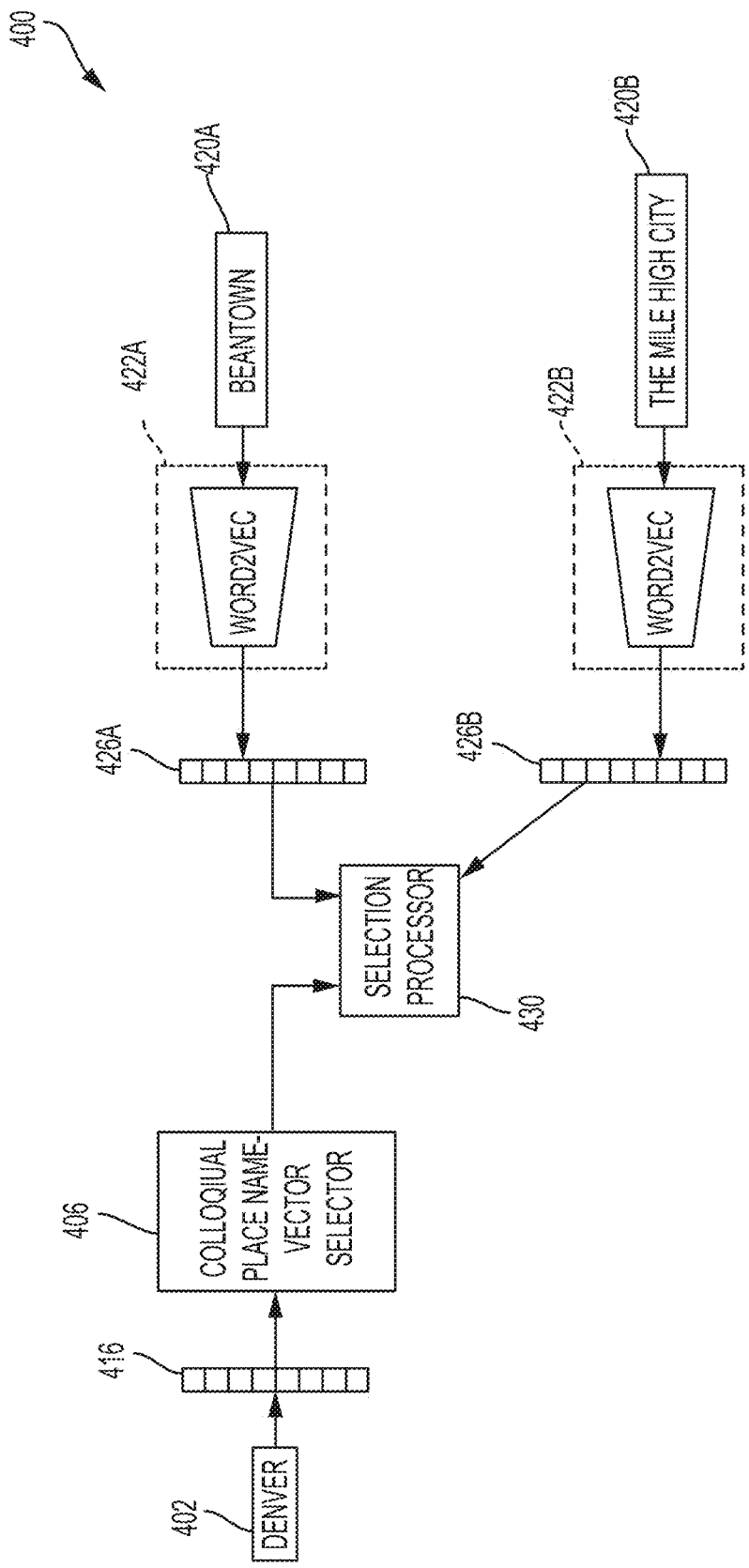
FIG. 4 illustrates a diagram showing how one or more colloquial place name can be selected based on an input value, according to some embodiments.

FIG. 4 illustrates diagram 400 showing how a colloquial place name or a plurality of colloquial place names can be selected for a given input value according to some embodiments. The following descriptions may refer to the components of data-processing device 102 and various relational databases 120, 130, and 140, as described above with respect to FIG. 1.

Selection processor 430 (e.g., selection processor 112 of FIG. 1) can be configured to select one or more of colloquial place names 420A and colloquial place name 420B for a received input value 402. As shown in diagram 400, selection processor 430 may compare a input value vector 416 corresponding to input value 402 with a plurality of colloquial place name vectors 426A and 426B corresponding to colloquial place names 420A and 420B to select one or more of colloquial place names 420A and 420B as being associated with input value 402.

In some embodiments, colloquial place name-vector selector 406 (e.g., colloquial place name-vector selector 110) can select one or more of colloquial place name vector 426A and 426B based on input value 402. For example, word-colloquial place name-vector selector 406 may query a database (e.g., colloquial place name relational database 120) storing associations between colloquial place names and colloquial place name vectors to retrieve one or more of colloquial place name vector 426A and 426B. In some embodiments, the associations between colloquial place names and colloquial place name vectors can be generated based on a word-embedding process, as discussed above with respect to FIGS. 1 and 2. For example, word-embedding processes 422A and 422B can use Word2Vec, as shown in FIG. 4, to generate colloquial place name vectors 426A and 426B that correspond to colloquial place names 420A and 420B, respectively.

In some embodiments, selection processor 430 can be configured to calculate a similarity score for each of colloquial place name vectors 426A and 426B where each similarity score quantifies a similarity between each of colloquial place name vector 426A and 426B and input value vector 416. In some embodiments, selection processor 430 can rank colloquial place name vectors 426A and 426B by the corresponding similarity scores to determine one or more of corresponding colloquial place names 420A and 420B that are more closely associated with received input value 402. In some embodiments, calculating the similarity score between two vectors includes calculating a distance metric (e.g., a Euclidean distance). In these embodiments, a smaller distance indicates that the two vectors are more "similar" and more closely associated with each other. For example, selection processor 430 may calculate Euclidean distances of 15.45 and 12.79 for colloquial place name vectors 426A and 426B, respectively. In this example, selection processor 430 may select and output colloquial place name 420B corresponding to colloquial place name vector 426B as the colloquial place name of "The Mile High City." According to process 400, this means that colloquial place name 420B, or "The Mile High City", is more similar to input value 402 of "Denver" than colloquial place name 420A, or "Beantown".

Input value 402 may include various categories of information. For example, input value 402 may include an official (non-colloquial) geographic location, a colloquial place name, a user identification, etc.

Figure 5:
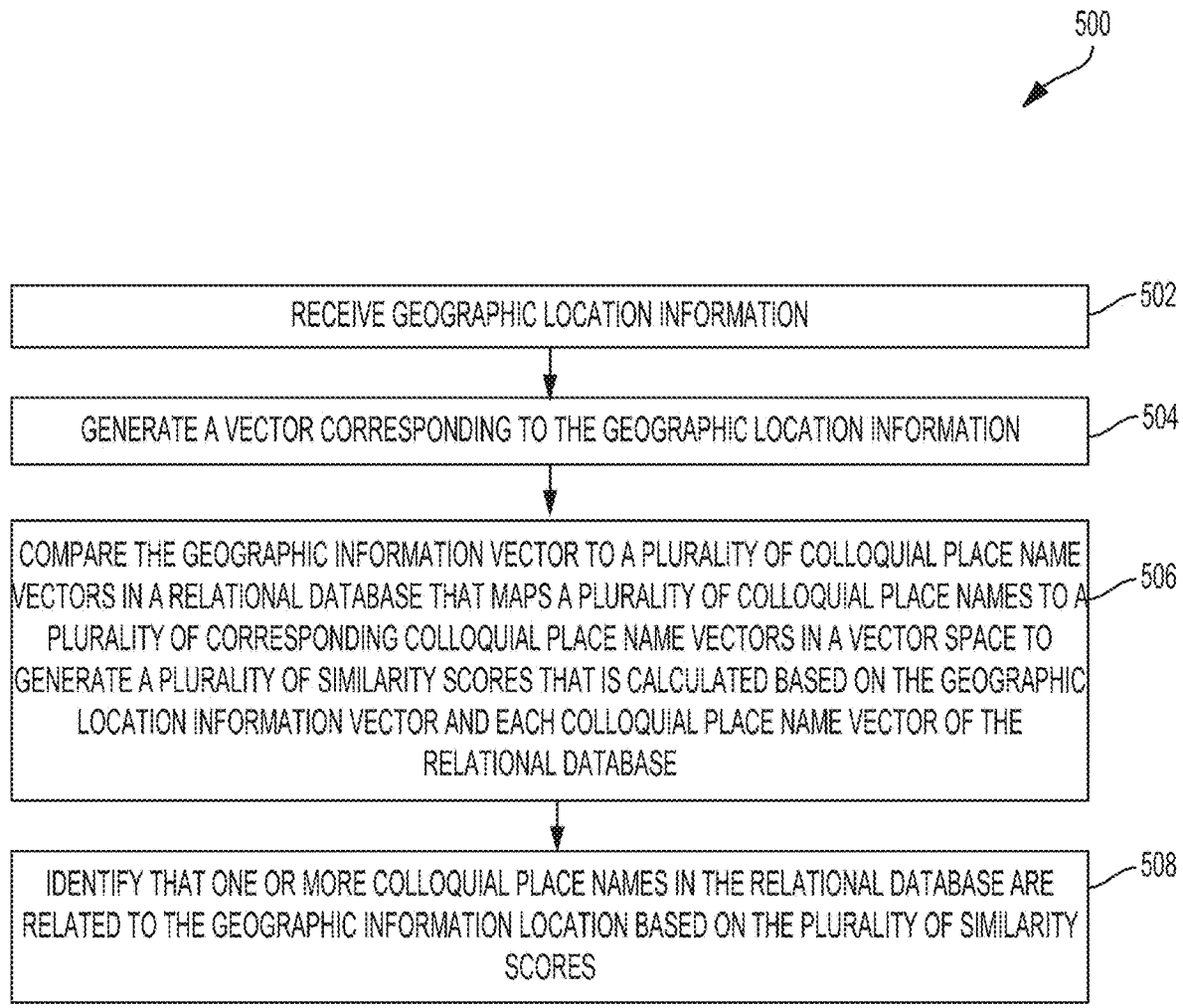
FIG. 5 illustrates a method for generating relationships between colloquial place names and identifying related colloquial place names in a relational database to geographic information, according to some embodiments.

FIG. 5 illustrates a flowchart of a method 500 for identifying relationships between colloquial place names in a relational database according to some embodiments. Method 500 can be performed by a data-processing device such as data-processing device 102 of FIG. 1. Accordingly, one or more of the steps below may reference the components of data-processing device 102. Method 500 can be performed by processing logic that may comprise hardware (e.g., circuitry, dedicated logic, programmable logic, microcode, etc.), software (e.g., instructions running on a processing device), or a combination thereof.

In step 502, a selection processor (e.g., selection processor 112) of the data-processing device receives geographic location information. For example, the data-processing device may include a user interface that allows a user to enter the colloquial place name on an input device (e.g., a keyboard or a touchscreen). In some embodiments, the selection processor receives the geographic location information from a remote device (e.g., a mobile device or a server) operated by the user. As mentioned above, geographic location information may include an official (non-colloquial) geographic location, a colloquial place name, etc.

In step 504, a vector can be generated to correspond to the geographic location information. For example, a word-embedding algorithm may be used to generate a geographic location information vector corresponding to the geographic location information.

In step 506, the geographic location information vector can be compared to a plurality of colloquial place name vectors in a relational database. The plurality of colloquial place name vectors can correspond to a plurality of colloquial place names in a vector space of the relational database. To compare the geographic location information vector to the plurality of colloquial place name vectors, a plurality of similarity scores can be calculated. A similarity score can be calculated between the geographic location information vector and each colloquial place name vector of the plurality of colloquial place name vectors. A similarity score can be generated by calculating a cosine similarity, a Sorensen-Dice coefficient, Jaccard index, or any other suitable method for calculating the similarity between two vectors.

In step 508, one or more colloquial place names can be identified based on the plurality of similarity scores. For example, one or more colloquial place names can be identified as corresponding to one or more colloquial place name vectors corresponding to a similarity score above a pre-determined threshold. In some embodiments, a user may determine to identify a pre-determined number of colloquial place names corresponding to the highest similarity scores (e.g., the colloquial place names corresponding to the top ten colloquial place name vectors having the highest similarity scores based on the geographic location information).

Figure 6:
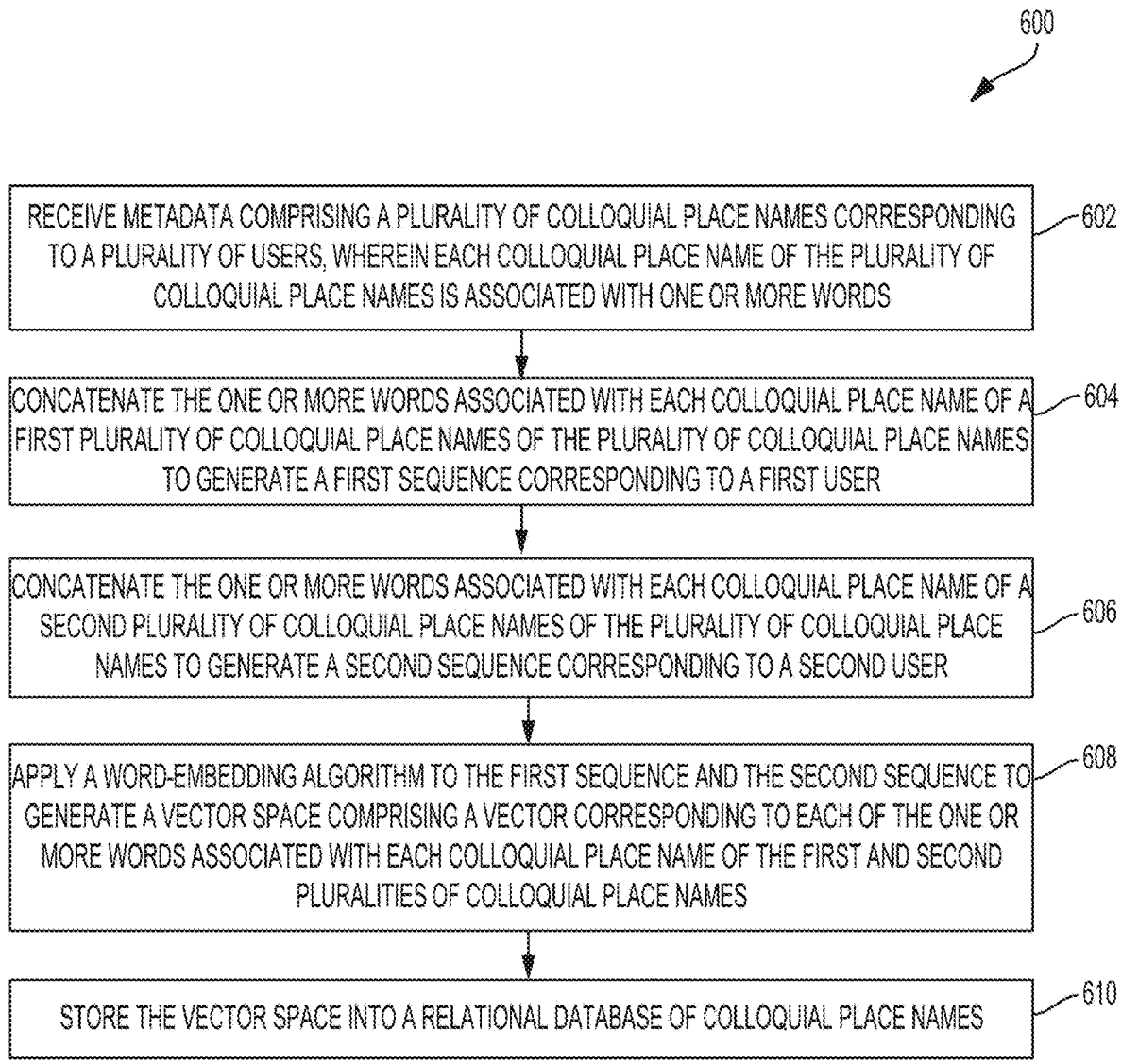
FIG. 6 illustrates a method for generating a relational database of colloquial place names, according to some embodiments.

FIG. 6 illustrates a flowchart of a method 600 for generating a relational database of colloquial place names according to some embodiments. Method 600 can be performed by a data-processing device such as data-processing device 102 of FIG. 1. Accordingly, one or more of the steps below may reference the components of data-processing device 102. Method 600 can be performed by processing logic that may comprise hardware (e.g., circuitry, dedicated logic, programmable logic, microcode, etc.), software (e.g., instructions running on a processing device), or a combination thereof.

In step 602, a selection processor (e.g., selection processor 112) of the data-processing device receives metadata comprising a plurality of colloquial place names. In some embodiments, the metadata may comprise a plurality of colloquial place names corresponding to a plurality of users. The colloquial place names may be associated with one or more words. The users may be users of a social media platform, and two or more colloquial place names may correspond to each user. In some embodiments, it may be assumed that the two or more colloquial place names associated with each user are geographically related in a meaningful way.

In step 604, the one or more words associated with a first plurality of colloquial place names of the plurality of colloquial place names may be concatenated to generate a first sequence. This first sequence of one or more words associated with a first plurality of colloquial place names can correspond to a first user. A similar process can be performed for step 606, wherein one or more words corresponding to a second plurality of colloquial place names of the plurality of colloquial place names is concatenated to generate a second sequence corresponding to a second user.

In step 608, a word-embedding algorithm can be applied to the first sequence and the second sequence to generate a vector space. The vector space can include a vector corresponding to each of the one or more words corresponding to each colloquial place name of the first and second pluralities of colloquial place names. Word-embedding is described in more detail with respect to FIGS. 1 and 2.

In step 610, the vector space generated in step 608 can be stored into a relational database of colloquial place names.

Figure 7:
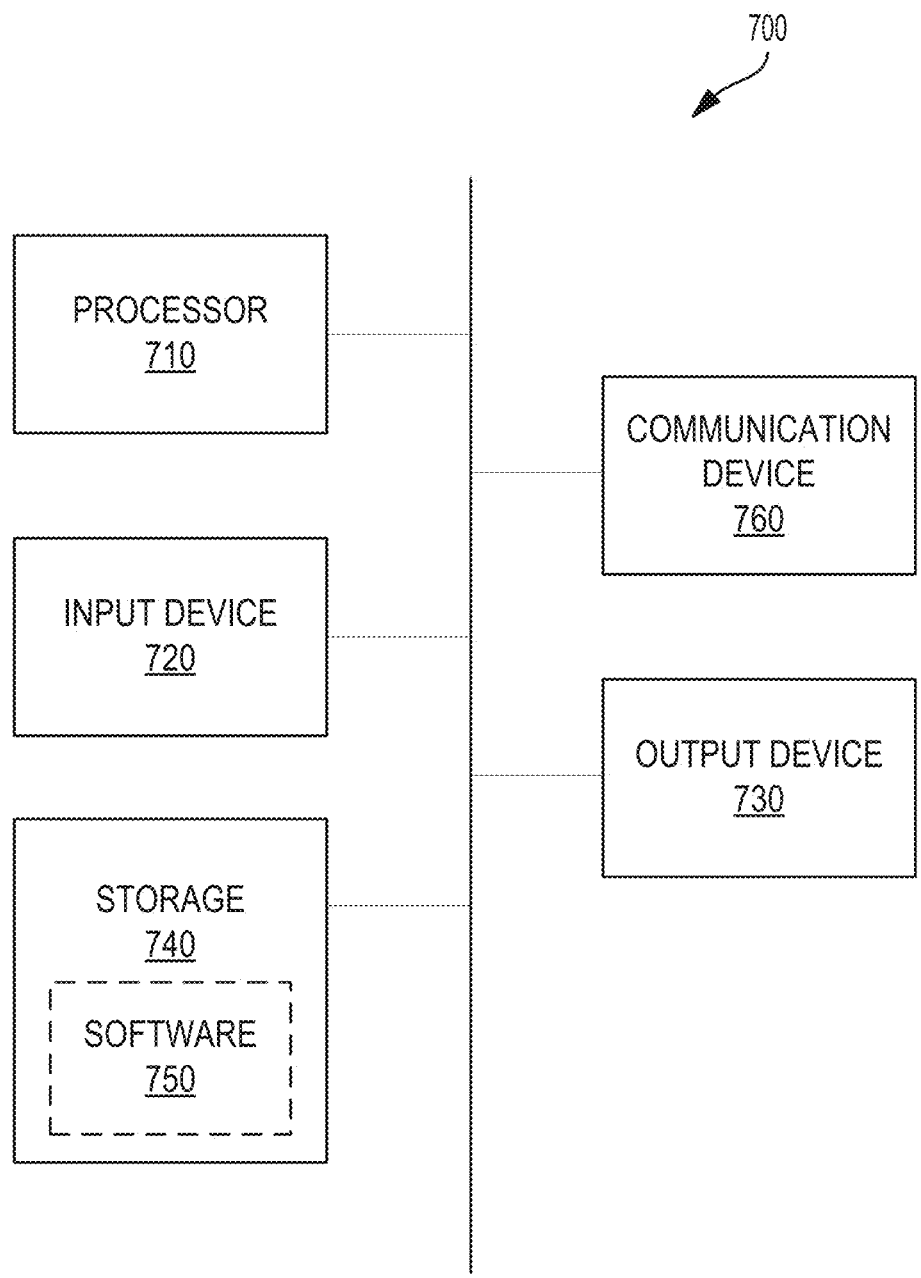
FIG. 7 illustrates an example of a computing device according to some embodiments.

FIG. 7 illustrates an example of a computer, according to some embodiments. Computer 700 can be a component of a system for identifying colloquial place names according to the systems and methods described above, such as system 100 of FIG. 1, or can include the entire system itself. In some embodiments, computer 700 is configured to execute a method for identifying one or more colloquial place name based on geographic location information or generating a relational database, such as methods 500 and 600 of FIGS. 5 and 6, respectively.

Computer 700 can be a host computer connected to a network. Computer 700 can be a client computer or a server. As shown in FIG. 7, computer 700 can be any suitable type of microprocessor-based device, such as a personal computer, workstation, server, or handheld computing device, such as a phone or tablet. The computer can include, for example, one or more of processor 710, input device 720, output device 730, storage 740, and communication device 760. Input device 720 and output device 730 can correspond to those described above and can either be connectable or integrated with the computer.

Input device 720 can be any suitable device that provides input, such as a touch screen or monitor, keyboard, mouse, or voice-recognition device. Output device 730 can be any suitable device that provides an output, such as a touch screen, monitor, printer, disk drive, or speaker.

Storage 740 can be any suitable device that provides storage, such as an electrical, magnetic, or optical memory, including a random access memory (RAM), cache, hard drive, CD-ROM drive, tape drive, or removable storage disk. Communication device 760 can include any suitable device capable of transmitting and receiving signals over a network, such as a network interface chip or card. The components of the computer can be connected in any suitable manner, such as via a physical bus or wirelessly. Storage 740 can be a non-transitory computer-readable storage medium comprising one or more programs, which, when executed by one or more processors, such as processor 710, cause the one or more processors to execute methods described herein, such as methods 500 and 600 of FIGS. 5 and 6, respectively.

Software 750, which can be stored in storage 740 and executed by processor 710, can include, for example, the programming that embodies the functionality of the present disclosure (e.g., as embodied in the systems, computers, servers, and/or devices as described above). In some embodiments, software 750 can include a combination of servers such as application servers and database servers.

Software 750 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method of generating a relational database of colloquial place names comprising:
   receiving metadata comprising a plurality of colloquial place names, wherein a first plurality of colloquial place names of the plurality of colloquial place names corresponds to a first user and a second plurality of colloquial place names of the plurality of colloquial place names corresponds to a second user, and wherein each colloquial place name of the plurality of colloquial place names is associated with one or more words;
   concatenating the one or more words associated with each colloquial place name of the first plurality of colloquial place names to generate a first sequence corresponding to the first user, wherein the first sequence comprises the one or more words of the first plurality of colloquial place names and corresponds to the first user;
   concatenating the one or more words associated with each colloquial place name of the second plurality of colloquial place names to generate a second sequence corresponding to the second user, wherein the second sequence comprises the one or more words of the second plurality of colloquial place names and corresponds to the second user;
   applying a word-embedding algorithm to the first sequence and the second sequence to generate a vector space comprising a vector corresponding to each of the one or more words associated with each colloquial place name of the first plurality of colloquial place names and a vector corresponding to each of the one or more words associated with each colloquial place name of the second plurality of colloquial place names, wherein a first vector corresponding to a first colloquial place name of the first plurality of colloquial place names is located a first distance from a second vector corresponding to a second colloquial place name of the first plurality of colloquial place names in the vector space, and the first vector is located a second distance from a third vector corresponding to a third colloquial place name of the second plurality of colloquial place names, wherein the second distance is greater than the first distance; and
   storing the vector space into a relational database of colloquial place names.

2. The method of claim 1, wherein the third vector corresponding to a third colloquial place name of the second plurality of colloquial place names is located a third distance from a fourth vector corresponding to a fourth colloquial place name of the second plurality of colloquial place names in the vector space, and the third vector is located a fourth distance from the second vector corresponding to a second colloquial place name of the first plurality of colloquial place names in the vector space, wherein the fourth distance is greater than the third distance.

3. The method of claim 1, wherein the first distance is determined by calculating a Euclidean distance between the first vector corresponding to the first colloquial place name of the first plurality of colloquial place names and the second vector corresponding to the second colloquial place name of the first plurality of colloquial place names and the second distance is determined by calculating a Euclidean distance between the first vector and the third vector corresponding to a third colloquial place name of the second plurality of colloquial place names.

4. The method of claim 2, wherein the third distance is determined by calculating a Euclidean distance between the third vector corresponding to the third colloquial place name of the second plurality of colloquial place names and the fourth vector corresponding to the fourth colloquial place name of the second plurality of colloquial place names and the fourth distance is determined by calculating a Euclidean distance between the third vector and the second vector corresponding to a second colloquial place name of the first plurality of colloquial place names in the vector space.

5. The method of claim 1, wherein the word-embedding algorithm comprises one of word2vec, GloVe, or FastText.

6. The method of claim 1, wherein the metadata comprises a plurality of colloquial place names associated with a plurality of users of a social media platform, and wherein two or more colloquial place names of the plurality of colloquial place names are associated with each user of the plurality of users.

7. The method of claim 1, wherein each colloquial place name of the first plurality of colloquial place names corresponding to the first user correspond to a first geographic location and each colloquial place name of the second plurality of colloquial place names corresponding to the second user correspond to a second geographic location.

8. The method of claim 1, wherein the one or more words associated with each colloquial place names of the plurality of colloquial place names comprises one or more of a letter of an alphabet, a numeral, a symbol, punctuation, or an emoji.

9. The method of claim 1, comprising:
applying a de-duplication algorithm to the first sequence and the second sequence to eliminate from the metadata any duplicate colloquial place names associated with a single user;
applying a tokenizing algorithm to the first sequence and the second sequence to identify and insert boundaries into the one or more words associated with each colloquial place name; and
applying a phrase-identifying algorithm to the first sequence and the second sequence to identify one or more words that comprise a multi-word phrase.

10. The method of claim 1, wherein a fourth colloquial place name of the first plurality of colloquial place names is associated with a first geographic location and a fifth colloquial place name of the first plurality of colloquial place names is associated with a second geographic location.

11. The method of claim 10, wherein the fifth colloquial place name of the first plurality of colloquial place names is not associated with a geographic location at which the first user is located.

12. A system for generating a relational database of colloquial place names comprising:
one or more processors and memory storing one or more programs that when executed by the one or more processors cause the one or more processors to:
receive metadata comprising a plurality of colloquial place names, wherein a first plurality of colloquial place names of the plurality of colloquial place names corresponds to a first user and a second plurality of colloquial place names of the plurality of colloquial place names corresponds to a second user, and wherein each colloquial place name of the plurality of colloquial place names is associated with one or more words;
concatenate the one or more words associated with each colloquial place name of the first plurality of colloquial place names to generate a first sequence corresponding to the first user, wherein the first sequence comprises the one or more words of the first plurality of colloquial place names and corresponds to the first user;
concatenate the one or more words associated with each colloquial place name of the second plurality of colloquial place names to generate a second sequence corresponding to the second user, wherein the second sequence comprises the one or more words of the second plurality of colloquial place names and corresponds to the second user;
apply a word-embedding algorithm to the first sequence and the second sequence to generate a vector space comprising a vector corresponding to each of the one or more words associated with each colloquial place name of the first plurality of colloquial place names and a vector corresponding to each of the one or more words associated with each colloquial place name of the second plurality of colloquial place names, wherein a first vector corresponding to a first colloquial place name of the first plurality of colloquial place names is located a first distance from a second vector corresponding to a second colloquial place name of the first plurality of colloquial place names in the vector space, and the first vector is located a second distance from a third vector corresponding to a third colloquial place name of the second plurality of colloquial place names, wherein the second distance is greater than the first distance; and
store the vector space into a relational database of colloquial place names.

13. The system of claim 12, wherein the third vector corresponding to a third colloquial place name of the second plurality of colloquial place names is located a third distance from a fourth vector corresponding to a fourth colloquial place name of the second plurality of colloquial place names in the vector space, and the third vector is located a fourth distance from the second vector corresponding to a second colloquial place name of the first plurality of colloquial place names in the vector space, wherein the fourth distance is greater than the third distance.

14. The system of claim 12, wherein the first distance is determined by calculating a Euclidean distance between the first vector corresponding to the first colloquial place name of the first plurality of colloquial place names and the second vector corresponding to the second colloquial place name of the first plurality of colloquial place names and the second distance is determined by calculating a Euclidean distance between the first vector and the third vector corresponding to a third colloquial place name of the second plurality of colloquial place names.

15. The system of claim 13, wherein the third distance is determined by calculating a Euclidean distance between the third vector corresponding to the third colloquial place name of the second plurality of colloquial place names and the fourth vector corresponding to the fourth colloquial place name of the second plurality of colloquial place names and the fourth distance is determined by calculating a Euclidean distance between the third vector and the second vector corresponding to a second colloquial place name of the first plurality of colloquial place names in the vector space.

16. The system of claim 12, wherein the word-embedding algorithm comprises one of wor(Original) d2vec, GloVe, or FastText.

17. The system of claim 13, wherein the metadata comprises a plurality of colloquial place names associated with a plurality of users of a social media platform, and wherein two or more colloquial place names of the plurality of colloquial place names are associated with each user of the plurality of users.

18. The system of claim 12, wherein each colloquial place name of the first plurality of colloquial place names corresponding to the first user correspond to a first geographic location and each colloquial place name of the second plurality of colloquial place names corresponding to the second user correspond to a second geographic location.

19. The system of claim 12, wherein the one or more words associated with each colloquial place names of the plurality of colloquial place names comprises one or more of a letter of an alphabet, a numeral, a symbol, punctuation, or an emoji.

20. The system of claim 12, comprising:
  apply a de-duplication algorithm to the first sequence and the second sequence to eliminate from the metadata any duplicate colloquial place names associated with a single user;
  apply a tokenizing algorithm to the first sequence and the second sequence to identify and insert boundaries into the one or more words associated with each colloquial place name; and
  apply a phrase-identifying algorithm to the first sequence and the second sequence to identify one or more words that comprise a multi-word phrase.

* * * * *